United States Patent
Grichnik et al.

(10) Patent No.: US 8,478,506 B2
(45) Date of Patent: Jul. 2, 2013

(54) VIRTUAL SENSOR BASED ENGINE CONTROL SYSTEM AND METHOD

(75) Inventors: Anthony J. Grichnik, Peoria, IL (US); Evan E. Jacobson, Peoria, IL (US); Amit Jayachandran, Peoria, IL (US); Michael Seskin, Cardiff, CA (US)

(73) Assignee: Caterpillar Inc., Peoria, IL (US)

( * ) Notice: Subject to any disclaimer, the term of this patent is extended or adjusted under 35 U.S.C. 154(b) by 2012 days.

(21) Appl. No.: 11/529,267

(22) Filed: Sep. 29, 2006

(65) Prior Publication Data

US 2008/0201054 A1      Aug. 21, 2008

(51) Int. Cl.
*G06F 7/70*  (2006.01)

(52) U.S. Cl.
USPC .......................................... 701/102; 701/105

(58) Field of Classification Search
USPC .. 701/101–106, 109, 110, 114, 115; 123/350, 123/352, 480, 486, 488; 702/182, 183, 185, 702/187, 199; 60/267, 268, 285, 286
See application file for complete search history.

(56) References Cited

U.S. PATENT DOCUMENTS

| | | |
|---|---|---|
| 3,316,395 A | 4/1967 | Lavin |
| 4,136,329 A | 1/1979 | Trobert |
| 4,533,900 A | 8/1985 | Muhlberger et al. |
| 5,014,220 A | 5/1991 | McMann et al. |
| 5,163,412 A | 11/1992 | Neu et al. |
| 5,262,941 A | 11/1993 | Saladin et al. |
| 5,341,315 A | 8/1994 | Niwa et al. |
| 5,386,373 A | 1/1995 | Keeler et al. |
| 5,434,796 A | 7/1995 | Weininger |
| 5,539,638 A | 7/1996 | Keeler et al. |
| 5,548,528 A | 8/1996 | Keeler et al. |
| 5,561,610 A | 10/1996 | Schricker et al. |
| 5,566,091 A | 10/1996 | Schricker et al. |
| 5,585,553 A | 12/1996 | Schricker |
| 5,594,637 A | 1/1997 | Eisenberg et al. |
| 5,598,076 A | 1/1997 | Neubauer et al. |
| 5,604,306 A | 2/1997 | Schricker |

(Continued)

FOREIGN PATENT DOCUMENTS

| | | |
|---|---|---|
| EP | 1103926 | 5/2001 |
| EP | 1367248 | 12/2003 |

(Continued)

OTHER PUBLICATIONS

Michael L. Traver et al., "A Neural Network-Based Virtual NOx Sensor for Diesel Engines", West Virginia University, Mechanical and Aerospace Engineering Dept., Morgantown, WV 26506-6106, (2000).

(Continued)

*Primary Examiner* — John T. Kwon
*Assistant Examiner* — Johnny Hoang
(74) *Attorney, Agent, or Firm* — Finnegan, Henderson, Farabow, Garrett & Dunner LLP

(57) ABSTRACT

A method is provided for a virtual sensor system. The method may include obtaining data records associated with a plurality of input parameters and at least one output parameter and adjusting values of the input parameters based on autocorrelation of respective input parameters. The method may also include reconfiguring the input parameters based on cross-correlation of respective input parameters relative to the output parameter and establishing a first virtual sensor process model indicative of interrelationships between the adjusted and reconfigured input parameters and the output parameter.

25 Claims, 9 Drawing Sheets

U.S. PATENT DOCUMENTS

| | | | |
|---|---|---|---|
| 5,604,895 | A | 2/1997 | Raimi |
| 5,608,865 | A | 3/1997 | Midgely et al. |
| 5,666,297 | A | 9/1997 | Britt et al. |
| 5,682,317 | A | 10/1997 | Keeler et al. |
| 5,698,780 | A | 12/1997 | Mizutani et al. |
| 5,727,128 | A | 3/1998 | Morrison |
| 5,750,887 | A | 5/1998 | Schricker |
| 5,752,007 | A | 5/1998 | Morrison |
| 5,835,902 | A | 11/1998 | Jannarone |
| 5,842,202 | A | 11/1998 | Kon |
| 5,914,890 | A | 6/1999 | Sarangapani et al. |
| 5,925,089 | A | 7/1999 | Fujime |
| 5,950,147 | A | 9/1999 | Sarangapani et al. |
| 5,966,312 | A | 10/1999 | Chen |
| 5,987,976 | A | 11/1999 | Sarangapani |
| 6,086,617 | A | 7/2000 | Waldon et al. |
| 6,092,016 | A | 7/2000 | Sarangapani et al. |
| 6,119,074 | A | 9/2000 | Sarangapani |
| 6,145,066 | A | 11/2000 | Atkin |
| 6,195,648 | B1 | 2/2001 | Simon et al. |
| 6,199,007 | B1 | 3/2001 | Zavarehi et al. |
| 6,208,982 | B1 | 3/2001 | Allen, Jr. et al. |
| 6,223,133 | B1 | 4/2001 | Brown |
| 6,236,908 | B1 | 5/2001 | Cheng et al. |
| 6,240,343 | B1 | 5/2001 | Sarangapani et al. |
| 6,269,351 | B1 | 7/2001 | Black |
| 6,298,718 | B1 | 10/2001 | Wang |
| 6,370,544 | B1 | 4/2002 | Krebs et al. |
| 6,405,122 | B1 | 6/2002 | Yamaguchi |
| 6,438,430 | B1 | 8/2002 | Martin et al. |
| 6,442,511 | B1 | 8/2002 | Sarangapani et al. |
| 6,477,660 | B1 | 11/2002 | Sohner |
| 6,513,018 | B1 | 1/2003 | Culhane |
| 6,546,379 | B1 | 4/2003 | Hong et al. |
| 6,584,768 | B1 | 7/2003 | Hecker et al. |
| 6,594,989 | B1 | 7/2003 | Hepburn et al. |
| 6,698,203 | B2 | 3/2004 | Wang |
| 6,711,676 | B1 | 3/2004 | Zomaya et al. |
| 6,721,606 | B1 | 4/2004 | Kaji et al. |
| 6,725,208 | B1 | 4/2004 | Hartman et al. |
| 6,763,708 | B2 | 7/2004 | Ting et al. |
| 6,775,647 | B1 | 8/2004 | Evans et al. |
| 6,785,604 | B2 | 8/2004 | Jacobson |
| 6,810,442 | B1 | 10/2004 | Lin et al. |
| 6,823,675 | B2 | 11/2004 | Brunell et al. |
| 6,859,770 | B2 | 2/2005 | Ramsey |
| 6,859,785 | B2 | 2/2005 | Case |
| 6,865,883 | B2 | 3/2005 | Gomulka |
| 6,882,929 | B2 | 4/2005 | Liang et al. |
| 6,895,286 | B2 | 5/2005 | Kaji et al. |
| 6,935,313 | B2 | 8/2005 | Jacobson |
| 6,941,287 | B1 | 9/2005 | Vaidyanathan et al. |
| 6,952,662 | B2 | 10/2005 | Wegerich et al. |
| 6,976,062 | B1 | 12/2005 | Denby et al. |
| 7,000,229 | B2 | 2/2006 | Gere |
| 7,024,343 | B2 | 4/2006 | El-Ratal |
| 7,027,953 | B2 | 4/2006 | Klein |
| 7,035,834 | B2 | 4/2006 | Jacobson |
| 7,117,079 | B2 | 10/2006 | Streichsbier et al. |
| 7,124,047 | B2 | 10/2006 | Zhang et al. |
| 7,127,892 | B2 | 10/2006 | Akins et al. |
| 7,174,284 | B2 | 2/2007 | Dolansky et al. |
| 7,178,328 | B2 | 2/2007 | Solbrig |
| 7,191,161 | B1 | 3/2007 | Rai et al. |
| 7,194,392 | B2 | 3/2007 | Tuken et al. |
| 7,213,007 | B2 | 5/2007 | Grichnik |
| 7,356,393 | B1 | 4/2008 | Schlatre et al. |
| 7,369,925 | B2 | 5/2008 | Morioka et al. |
| 7,565,333 | B2 | 7/2009 | Grichnik et al. |
| 2002/0014294 | A1 | 2/2002 | Okano et al. |
| 2002/0016701 | A1 | 2/2002 | Duret et al. |
| 2002/0042784 | A1 | 4/2002 | Kerven et al. |
| 2002/0049704 | A1 | 4/2002 | Vanderveldt et al. |
| 2002/0103996 | A1 | 8/2002 | LeVasseur et al. |
| 2002/0198821 | A1 | 12/2002 | Munoz |
| 2003/0018503 | A1 | 1/2003 | Shulman |
| 2003/0055607 | A1 | 3/2003 | Wegerich et al. |
| 2003/0093250 | A1 | 5/2003 | Goebel |
| 2003/0126053 | A1 | 7/2003 | Boswell et al. |
| 2003/0126103 | A1 | 7/2003 | Chen et al. |
| 2003/0130855 | A1 | 7/2003 | Babu et al. |
| 2003/0167354 | A1 | 9/2003 | Peppers et al. |
| 2003/0187567 | A1 | 10/2003 | Sulatisky et al. |
| 2003/0187584 | A1 | 10/2003 | Harris |
| 2003/0200296 | A1 | 10/2003 | Lindsey |
| 2004/0030420 | A1 | 2/2004 | Ulyanov et al. |
| 2004/0034857 | A1 | 2/2004 | Mangino et al. |
| 2004/0059518 | A1 | 3/2004 | Rothschild |
| 2004/0077966 | A1 | 4/2004 | Yamaguchi et al. |
| 2004/0122702 | A1 | 6/2004 | Sabol et al. |
| 2004/0122703 | A1 | 6/2004 | Walker et al. |
| 2004/0128058 | A1 | 7/2004 | Andres et al. |
| 2004/0135677 | A1 | 7/2004 | Asam |
| 2004/0138995 | A1 | 7/2004 | Hershkowitz et al. |
| 2004/0153227 | A1 | 8/2004 | Hagiwara et al. |
| 2004/0230404 | A1 | 11/2004 | Messmer et al. |
| 2004/0267818 | A1 | 12/2004 | Hartenstine |
| 2005/0047661 | A1 | 3/2005 | Mauer |
| 2005/0055176 | A1 | 3/2005 | Clarke et al. |
| 2005/0091093 | A1 | 4/2005 | Bhaskaran et al. |
| 2005/0192727 | A1* | 9/2005 | Shostak et al. .................. 701/37 |
| 2005/0209943 | A1 | 9/2005 | Ballow et al. |
| 2005/0210337 | A1 | 9/2005 | Chester et al. |
| 2005/0240539 | A1 | 10/2005 | Olavson |
| 2005/0261791 | A1 | 11/2005 | Chen et al. |
| 2005/0262031 | A1 | 11/2005 | Saidi et al. |
| 2005/0278227 | A1 | 12/2005 | Esary et al. |
| 2005/0278432 | A1 | 12/2005 | Feinleib et al. |
| 2006/0010057 | A1 | 1/2006 | Bradway et al. |
| 2006/0010142 | A1 | 1/2006 | Kim et al. |
| 2006/0010157 | A1 | 1/2006 | Dumitrascu et al. |
| 2006/0025897 | A1 | 2/2006 | Shostak et al. |
| 2006/0026270 | A1 | 2/2006 | Sadovsky et al. |
| 2006/0026587 | A1 | 2/2006 | Lemarroy et al. |
| 2006/0064474 | A1 | 3/2006 | Feinleib et al. |
| 2006/0068973 | A1 | 3/2006 | Kappauf et al. |
| 2006/0129289 | A1 | 6/2006 | Kumar et al. |
| 2006/0130052 | A1 | 6/2006 | Allen et al. |
| 2006/0229753 | A1 | 10/2006 | Seskin et al. |
| 2006/0229769 | A1 | 10/2006 | Grichnik et al. |
| 2006/0229852 | A1 | 10/2006 | Grichnik et al. |
| 2006/0229854 | A1 | 10/2006 | Grichnik et al. |
| 2006/0230018 | A1 | 10/2006 | Grichnik et al. |
| 2006/0230097 | A1 | 10/2006 | Grichnik et al. |
| 2006/0230313 | A1 | 10/2006 | Grichnik et al. |
| 2006/0241923 | A1 | 10/2006 | Xu et al. |
| 2006/0247798 | A1 | 11/2006 | Subbu et al. |
| 2007/0061144 | A1 | 3/2007 | Grichnik et al. |
| 2007/0094048 | A1 | 4/2007 | Grichnik |
| 2007/0094181 | A1 | 4/2007 | Tayebnejad et al. |
| 2007/0118338 | A1 | 5/2007 | Grichnik et al. |
| 2007/0124237 | A1 | 5/2007 | Sundararajan et al. |
| 2007/0150332 | A1 | 6/2007 | Grichnik et al. |
| 2007/0168494 | A1 | 7/2007 | Liu et al. |
| 2007/0179769 | A1 | 8/2007 | Grichnik et al. |
| 2007/0203864 | A1 | 8/2007 | Grichnik |
| 2008/0154811 | A1 | 6/2008 | Grichnik et al. |
| 2008/0243354 | A1 | 10/2008 | Grichnik et al. |

FOREIGN PATENT DOCUMENTS

| | | |
|---|---|---|
| EP | 1418481 | 5/2004 |
| JP | 10-332621 | 12/1998 |
| JP | 11-351045 | 12/1999 |
| JP | 2002-76344 | 9/2002 |
| WO | WO97/42581 | 11/1997 |
| WO | WO02/057856 | 7/2002 |
| WO | WO2006/017453 | 2/2006 |

OTHER PUBLICATIONS

Michael L. Traver et al., SAE Technical Paper Series, "Neural Network-Based Diesel Engine Emissions Prediction Using In-Cylinder Combustion Pressure", International Spring Fuels & Lubricants Meeting & Exposition, Dearborn, Michigan (May 3-6, 1999).

G. J. Thompson et al. "Neural network modeling of the emissions and performance of a heavy-duty diesel engine," 2000 IMechE proceedings.

Allen et al., "Supersaturated Designs That Maximize the Probability of Identifying Active Factors," 2003 American Statistical Association and the American Society for Quality, Technometrics, vol. 45, No. 1, Feb. 2003, pp. 1-8.

April, Jay et al., "Practical Introduction to Simulation Optimization," Proceedings of the 2003 Winter Simulation Conference, pp. 71-78.

Bandte et al., "Viable Designs Through a Joint Probabilistic Estimation Technique," SAE International, and the American Institute of Aeronautics and Astronautics, Inc., Paper No. 1999-01-5623, 1999, pp. 1-11.

Beisl et al., "Use of Genetic Algorithm to Identify the Source Point of Seepage Slick Clusters Interpreted from Radarsat-1 Images in the Gulf of Mexico," Geoscience and Remote Sensing Symposium, 2004, Proceedings, 2004 IEEE International Anchorage, AK, Sep. 20-24, 2004, vol. 6, Sep. 20, 2004, pp. 4139-4142.

Berke et al., "Optimum Design of Aerospace Structural Components Using Neural Networks," Computers and Structures, vol. 48, No. 6, Sep. 17, 1993, pp. 1001-1010.

Bezdek, "Genetic Algorithm Guided Clustering," IEEE 0-7803-1899-4/94, 1994, pp. 34-39.

Brahma et al., "Optimization of Diesel Engine Operating Parameters Using Neural Networks," SAE Technical Paper Series, 2003-01-3228, Oct. 27-30, 2003 (11 pages).

Chau et al., "Use of runs test to access cardiovascular autonomic function in diabetic subjects," Abstract, Diabetes Care, vol. 17, Issue 2, pp. 146-148, available at http://care.diabetesjournals.org/cgi/content/abstract/17/2/146), Feb. 1994.

Chung et al., "Process Optimal Design in Forging by Genetic Algorithm," Journal of Manufacturing Science and Engineering, vol. 124, May 2002, pp. 397-408.

Cox et al., "Statistical Modeling for Efficient Parametric Yield Estimation of MOS VLSI Circuits," IEEE, 1983, pp. 242-245.

De Maesschalck et al., "The Mahalanobis Distance," Chemometrics and Intelligent Laboratory Systems, vol. 50, No. 1, Jan. 2000, pp. 1-18.

Dikmen et al., "Estimating Distributions in Genetic Algorithms," ISCIS 2003, LNCS 2869, 2003, pp. 521-528.

Galperin, G., et al., "Parallel Monte-Carlo Simulation of Neural Network Controllers," available at http://www-fp.mcs.anl.gov/ccst/research/reports_pre 1998/neural_network/galperin.html, printed Mar. 11, 2005 (6 pages).

Gletsos et al., "A Computer-Aided Diagnostic System to Characterize CT Focal Liver Lesions: Design and Optimization of a Neural Network Classifier," IEEE Transactions on InformationTechnology in Biomedicine, vol. 7, No. 3, Sep. 2003 pp. 153-162.

Grichnik et al., "An Improved Metric for Robust Engineering," Proceedings of the 2007 International Conference on Scientific Computing, Las Vegas, NV (4 pages).

Grichnik et al., Copending U.S. Appl. No. 11/812,164, filed Jun. 15, 2007, entitled Virtual Sensor System and Method.

Grichnik et al., Copending U.S. Appl. No. 11/979,408, filed Nov. 2, 2007, entitled Virtual Sensor Network (VSN) System and Method.

Holland, John H., "Genetic Algorithms," Scientific American, Jul. 1992, pp. 66-72.

Hughes et al., "Linear Statistics for Zeros of Riemann's Zeta Function," C.R. Acad. Sci. Paris, Ser. I335 (2002), pp. 667-670.

Ko et al., "Application of Artificial Neural Network and Taguchi Method to Perform Design in Metal Forming Considering Workability," International Journal of Machine Tools & Manufacture, vol. 39, No. 5, May 1999, pp. 771-785.

Kroha et al., "Object Server on a Parallel Computer," 1997 IEEE 0-8186-8147-0/97, pp. 284-288.

Mavris et al., "A Probabilistic Approach to Multivariate Constrained Robust Design Simulation," Society of Automotive Engineers, Inc., Paper No. 975508, 1997, pp. 1-11.

National Institute of Health, "10-year CVD Risk Calculator" available at http://hin.nhlbi.nih.gov/atpiii/calculator.asp?usertype=prof, printed Aug. 2, 2005, 2 pages.

Obayashi et al, "Multiobjective Evolutionary Computation for Supersonic Wing-Shape Optimization," IEEE Transactions on Evolutionary Computation, vol. 4, No. 2, Jul. 2000, pp. 182-187.

Simpson et al., "Metamodels for Computer-Based Engineering Design: Survey & Recommendations," Engineering with Computers, 2001, vol. 17, pp. 129-150.

Solar Turbines, "InSight System," Oct. 19, 2006, http://mysolar.cat.com.

Solar Turbines, "InSight Systems, Machinery Management Solutions," Oct. 19, 2006.

Song, "The Hyperellipsoidal Clustering Using Genetic Algorithm," 1997 IEEE International Conference on Intelligent Processing Systems, Oct. 28-31, 1997, Beijing, China, pp. 592-596.

Sytsma, Sid, "Quality and Statistical Process Control," available at http://www.sytsma.com/tqmtools/ctlchtprinciples.html, printed Apr. 7, 2005, 6 pages.

Taguchi et al., "The Mahalanobis-Taguchi Strategy," A Pattern Technology System, John Wiley & Sons, Inc., 2002, 234 pages.

Taylor et al., "Guidelines for Evaluating and Expressing the Uncertainty of NIST Measurement Results," NIST Technical Note 1297, 1994 Edition, United States Dept. of Commerce, National Institute of Standards and Technology (25 pages).

Woodall, Tsui et al., "A Review and Analysis of the Mahalanobis-Taguchi System," Technometrics, Feb. 2003, vol. 45, No. 1 (15 pages).

Wu et al., "Cam-phasing Optimization Using Artificial Neural Networks as Surrogate Models—Fuel Consumption and Nox Emissions," SAE Technical Paper Series, 2006-01-1512, Apr. 3-6, 2006 (19 pages).

Yang et al., "Similar Cases Retrieval from the Database of Laboratory Test Results," Journal of Medical Systems, vol. 27, No. 3, Jun. 2003, pp. 271-282.

Yuan et al., "Evolutionary Fuzzy C-Means Clustering Algorithm," 1995 IEEE 0-7803-2461-7/95, pp. 2221-2226.

\* cited by examiner

VIRTUAL SENSOR BASED ENGINE CONTROL SYSTEM AND METHOD

TECHNICAL FIELD

This disclosure relates generally to virtual sensor techniques and, more particularly, to virtual emission sensor systems and engine control systems using process models.

BACKGROUND

Physical sensors, such as nitrogen oxides ($NO_x$) sensors, are widely used in many products, such as modern vehicles, to measure and monitor various parameters associated with motor vehicles. Physical sensors often take direct measurements of the physical phenomena and convert these measurements into measurement data to be further processed by control systems. Although physical sensors take direct measurements of the physical phenomena, physical sensors and associated hardware are often costly and, sometimes, unreliable. Further, when control systems rely on physical sensors to operate properly, a failure of a physical sensor may render such control systems inoperable.

Instead of direct measurements, virtual sensors are developed to process various physically measured values and to produce values that are previously measured directly by physical sensors. For example, U.S. Pat. No. 5,386,373 (the '373 patent) issued to Keeler et al. on Jan. 31, 1995, discloses a virtual continuous emission monitoring system with sensor validation. The '373 patent uses a back propagation-to-activation model and a monte-carlo search technique to establish and optimize a computational model used for the virtual sensing system to derive sensing parameters from other measured parameters. However, such conventional techniques often fail to address inter-correlation between individual measured parameters, especially at the time of generation and/or optimization of computational models, or to correlate the other measured parameters to the sensing parameters.

Other techniques try to establish complex mathematical models to be used as virtual sensors. For example, Michael L. Traver et al., *"A Neural Network-Based Virtual NOx Sensor for Diesel Engines,"* discloses an in-cylinder combustion model using in-cylinder combustion-pressure-based variables to predict values of $NO_x$ emissions. However, such techniques often involve a large amount of calculation and may be computationally impractical for real-time applications.

Further, all these conventional techniques fail to consider correction of various conditions in real-time applications, such as signal delay, etc., associated with measured parameters. In addition, the conventional techniques often fail to use a closed-loop virtual sensor and engine control system structure to automatically adjusting the measured parameters themselves to improve performance of the engine control system.

Methods and systems consistent with certain features of the disclosed systems are directed to solving one or more of the problems set forth above.

SUMMARY OF THE INVENTION

One aspect of the present disclosure includes a method for a virtual sensor system. The method may include obtaining data records associated with a plurality of input parameters and at least one output parameter and adjusting values of the input parameters based on autocorrelation of respective input parameters. The method may also include reconfiguring the input parameters based on cross-correlation of respective input parameters relative to the output parameter and establishing a first virtual sensor process model indicative of interrelationships between the adjusted and reconfigured input parameters and the output parameter.

Another aspect of the present disclosure includes a method for a virtual sensor based engine control system. The method may include obtaining data records associated with a plurality of engine control parameters and a plurality of sensing parameters including a first sensing parameter and a second sensing parameter. The method may also include establishing a first virtual sensor process model indicative of interrelationships between the plurality of engine parameters and the first sensing parameter, wherein the plurality of engine parameters are both input parameters and output parameters of the first virtual sensor process model. Further, the method may include establishing a second virtual sensor process model indicative of interrelationships between the plurality of engine parameters and the second sensing parameter, wherein the plurality of engine parameters are both input parameters and output parameters of the first virtual sensor process model.

Another aspect of the present disclosure includes a computer system for establishing a virtual sensor system. The computer system may include a database and a processor. The database may be configured to store information relevant to the virtual sensor system. The processor may be configured to obtain data records associated with a plurality of input parameters and at least one output parameter and to adjust values of the input parameters based on autocorrelation of respective input parameters. The processor may also be configured to reconfigure the input parameters based on cross-correlation of respective input parameters relative to the output parameter and to establish a virtual sensor process model indicative of interrelationships between the adjusted and reconfigured input parameters and the output parameter.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
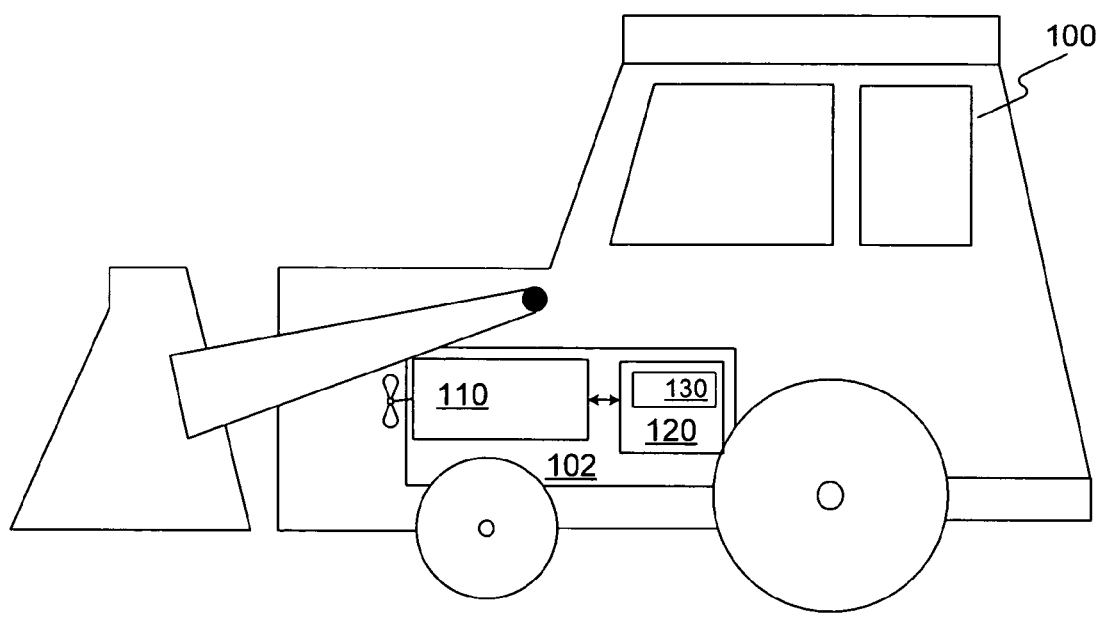
FIG. 1 illustrates an exemplary vehicle in which features and principles consistent with certain disclosed embodiments may be incorporated.

FIG. 1 illustrates an exemplary vehicle 100 in which features and principles consistent with certain disclosed embodiments may be incorporated. Vehicle 100 may include any type of fixed or mobile machine that performs some type of operation associated with a particular industry, such as mining, construction, farming, transportation, etc. and operates between or within work environments (e.g., construction site, mine site, power plants and generators, on-highway applications, etc.). Non-limiting examples of mobile machines include commercial machines, such as trucks, cranes, earth moving vehicles, mining vehicles, backhoes, material handling equipment, farming equipment, marine vessels, aircraft, and any type of movable machine that operates in a work environment. Vehicle 100 may also include any type of commercial vehicles such as cars, vans, and other vehicles.

As shown in FIG. 1, vehicle 100 may include an engine system 102. Engine system 102 may include an engine 110 and an engine control module (ECM) 120. Further, ECM 120 may include a virtual sensor system 130. It is understood that the devices are listed for illustrative purposes, other devices or components may also be included. For example, engine system 102 may also include various physical sensors (not shown) provided for measuring certain parameters of vehicle operating environment or engine parameters, such as emission sensors for measuring emissions of vehicle 100, such as nitrogen oxides ($NO_x$), sulfur dioxide ($SO_2$), carbon monoxide (CO), total reduced sulfur (TRS), etc.

Figure 2:
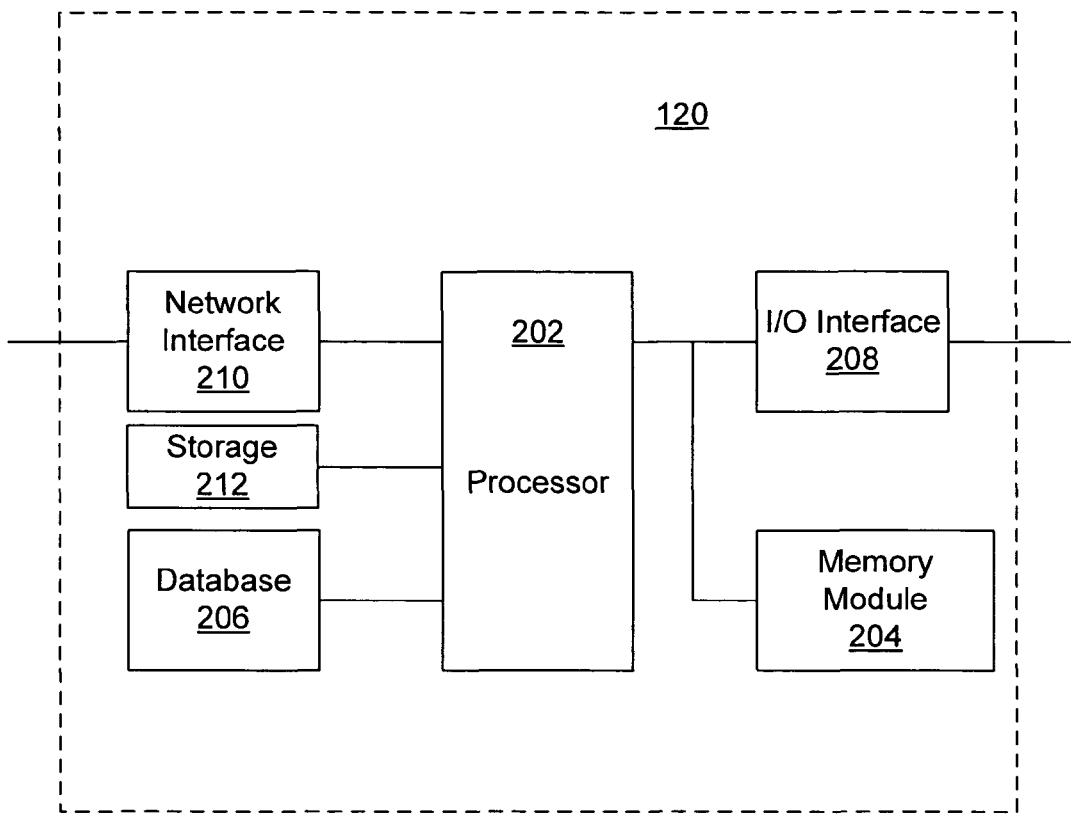
FIG. 2 illustrates a block diagram of an exemplary control system consistent with certain disclosed embodiments.

Engine 110 may include any appropriate type of engine or power source that generates power for vehicle 100, such as an internal combustion engine or an eletric-gas hybrid engine, etc. ECM 120 may include any appropriate type of engine control system configured to perform engine control functions such that engine 110 may operate properly. Further, ECM 120 may also control other systems of vehicle 100, such as transmission systems, and/or hydraulics systems, etc. FIG. 2 shows an exemplary functional block diagram of ECM 120.

As shown in FIG. 2, ECM 120 may include a processor 202, a memory module 204, a database 206, an I/O interface 208, a network interface 210, and a storage 212. Other components or devices, however, may also be included in ECM 120. Further, the listed devices and other devices may be implemented in hardware, such as field programmable gate array (FPGA) devices, etc., computer software, or a combination of hardware and software. Certain FPGA devices may be reconfigured to selectively support functions provided by the listed devices.

Processor 202 may include any appropriate type of general purpose microprocessor, digital signal processor, or microcontroller. Memory module 204 may include one or more memory devices including, but not limited to, a ROM, a flash memory, a dynamic RAM, and/or a static RAM. Memory module 204 may be configured to store information used by processor 202. More than one memory module may be included.

Database 206 may include any type of appropriate database containing information on engine parameters, operation conditions, mathematical models, and/or any other control information. Further, I/O interface 208 may include any appropriate type of device or devices provided to couple processor 202 to various physical sensors or other components (not shown) within engine system 102 or within vehicle 100.

Information may be exchanged between external devices or components, such as engine 110 or the various physical sensors, etc., and processor 202. A user or users of vehicle 100 may also exchange information with processor 202 through I/O interface 208. The users may input data to processor 202, and processor 202 may output data to the users, such as warning or status messages. Further, I/O interface 208 may also be used to obtain data from other components (e.g., the physical sensors, etc.) and/or to transmit data to these components from ECM 120.

Network interface 210 may include any appropriate type of network device capable of communicating with other computer systems based on one or more communication protocols. Network interface 210 may communicate with other computer systems within vehicle 100 or outside vehicle 100 via certain communication media such as control area network (CAN), local area network (LAN), and/or wireless communication networks.

Storage 212 may include any appropriate type of mass storage provided to store any type of information that processor 202 may need to operate. For example, storage 212 may include one or more floppy disk devices, hard disk devices, optical disk devices, or other storage devices to provide storage space.

Returning to FIG. 1, ECM 120 may include virtual sensor system 130 for providing various parameters used in engine control functions. Virtual sensor system 130 may include any appropriate type of control system that generate values of sensing parameters based on a computational model and a plurality of measured parameters.

As used herein, the sensing parameters may refer to those measurement parameters that are directly measured by a particular physical sensor. For example, a physical $NO_x$ emission sensor may measure the $NO_x$ emission level of vehicle 100 and provide values of $NO_x$ emission level, the sensing parameter, to ECM 120. Virtual sensor system 130 may include a virtual sensor to predict or derive a sensing parameter such that a corresponding physical sensor may be omitted. In certain embodiments, virtual sensor system 130 may include a plurality of virtual sensors based on process models. For example, virtual sensor system 130 may include a virtual $NO_x$ emission sensor to replace or supplement the physical $NO_x$ emission sensor to predict the sensing parameter of $NO_x$ emission level.

Sensing parameters may also include any output parameters that may be measured indirectly by physical sensors and/or calculated based on readings of physical sensors. For example, a virtual sensor may provide an intermediate sensing parameter that may be unavailable from any physical sensor. In general, sensing parameters may be included in outputs of a virtual sensor.

On the other hand, the measured parameters, as used herein, may refer to any parameters relevant to the sensing parameters and indicative of the state of a component or components of vehicle 100, such as engine 110. For example, for the sensing parameter $NO_x$ emission level, measured parameters may include machine and environmental parameters, such as compression ratios, turbocharger efficiency, after cooler characteristics, temperature values, pressure values, ambient conditions, fuel rates, and engine speeds, etc. Measured parameters may often be included in inputs to be provided to a virtual sensor.

Although virtual sensor system 130, as shown in FIG. 1, is configured to coincide with ECM 120, virtual sensor system 130 may also be configured as a separate control system or as a part of other control systems within vehicle 100. Further, ECM 120 may implement virtual sensor system 130 by using computer software, hardware, or a combination of software and hardware. For example, ECM 120 may execute software programs to generate the values of sensing parameters (e.g., $NO_x$ emission level) based on a computational model and other parameters.

Figure 3:
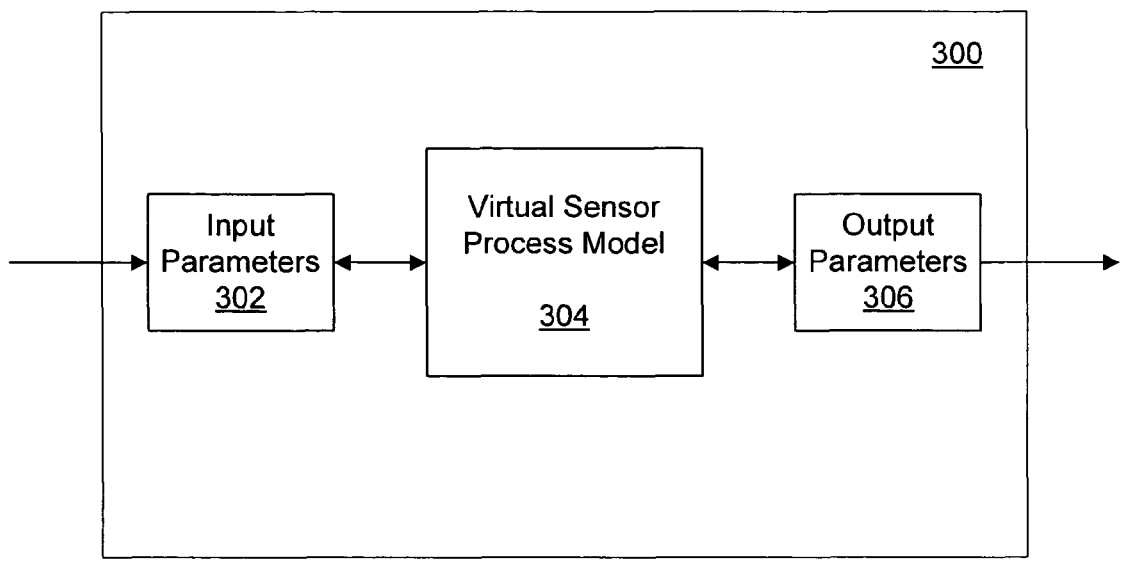
FIG. 3 illustrates a block diagram of an exemplary virtual sensor system consistent with certain disclosed embodiments.

In operation, computer software instructions may be stored in or loaded to ECM 120. ECM 120 may execute the computer software instructions to perform various control functions and processes to control engine 110 and to automatically adjust engine operational parameters, such as fuel injection timing and fuel injection pressure, etc. In particular, ECM 120 may execute computer software instructions to generate and/or operate virtual sensor system 130 and virtual sensors included in virtual sensor system 130 to provide engine emission values and other parameter values used to control engine 110. FIG. 3 shows a logical block diagram of an exemplary virtual sensor 300 included in virtual sensor system 130.

As shown in FIG. 3, virtual sensor 300 may include a virtual sensor process model 304, input parameters 302, and output parameters 306. Virtual sensor process model 304 may be established to build interrelationships between input parameters 302 (e.g., measured parameters) and output parameters 306 (e.g., sensing parameters). After virtual sensor process model 304 is established, values of input parameters 302 may be provided to virtual sensor process model 304 to generate values of output parameters 306 based on the given values of input parameters 302 and the interrelationships between input parameters 302 and output parameters 306 established by virtual sensor process model 304.

In certain embodiments, virtual sensor 300 may be configured to include a virtual emission sensor to provide levels of substance emitted from an exhaust system (not shown) of engine 110, such as levels of nitrogen oxides ($NO_x$), sulfur dioxide ($SO_2$), carbon monoxide (CO), total reduced sulfur (TRS), soot (i.e., a dark powdery deposit of unburned fuel residues in emission), and/or hydrocarbon (HC), etc. In particular, $NO_x$ emission level, soot emission level, and HC emission level may be important to normal operation of engine 110 and/or to meet certain environmental requirements. $NO_x$ emission level, soot emission level, and HC emission level may be referred to as regulated emission levels. Other emission levels, however, may also be included.

Input parameters 302 may include any appropriate type of data associated with or related to the regulated emission levels. For example, input parameters 302 may include parameters that control operations of various characteristics of engine 110 and/or parameters that are associated with conditions corresponding to the operations of engine 110. Input parameters 302 may include engine speed, fuel rate, injection timing, intake manifold temperature (IMAT), intake manifold pressure (IMAP), inlet valve actuation (IVA) end of current, IVA timing, injection pressure, etc. Further, input parameters 302 may be measured by certain physical sensors, such as a high precision lab grade physical sensor, or created by other control systems. Other parameters, however, may also be included. For example, input parameters 302 may also include some or all of total fuel injection quantity, oxygen/fuel molar ratio, atmospheric pressure, total induction mass flow, etc.

On the other hand, output parameters 306 may correspond to sensing parameters. For example, output parameters 306 of virtual sensor 300 may include an emission level of $NO_x$, a soot emission level, or an HC emission level, etc. Other types of output parameters, however, may also be used by virtual sensor 300. Output parameters 306 (e.g., $NO_x$ emission level, soot emission level, or HC emission level) may be used by ECM 120 to predict regulated emission levels and to control engine 110.

Virtual sensor process model 304 may include any appropriate type of mathematical or physical model indicating interrelationships between input parameters 302 and output parameters 306. For example, virtual sensor process model 304 may be a neural network based mathematical model that is trained to capture interrelationships between input parameters 302 and output parameters 306. Other types of mathematic models, such as fuzzy logic models, linear system models, and/or non-linear system models, etc., may also be used.

Virtual sensor process model 304 may be trained and validated using data records collected from a particular engine application for which virtual sensor process model 304 is established. That is, virtual sensor process model 304 may be established and/or operated according to particular rules corresponding to a particular type of model using the data records, and the interrelationships of virtual sensor process model 304 may be verified by using part of the data records.

After virtual sensor process model 304 is trained and validated, virtual sensor process model 304 may be optimized to define a desired input space of input parameters 302 and/or a desired distribution of output parameters 306. The validated or optimized virtual sensor process model 304 may be used to produce corresponding values of output parameters 306 when provided with a set of values of input parameters 302.

The establishment and operations of virtual sensor process model 304 may be carried out by processor 202 based on computer programs stored on or loaded to virtual sensor 300. Alternatively, the establishment of virtual sensor process model 304 may be realized by other computer systems, such as a separate computer system (not shown) configured to create process models. The created process model may then be loaded to virtual sensor 300 (e.g., ECM 120 containing block 130) for operations.

In certain embodiments, virtual sensor process model 304 may be used for real-time applications, such as engine control applications. Virtual sensor process model 304 may require that input parameters 302 correspond to values of the various parameters at substantially same point of time. That is, input parameters 302 may reflect a snapshot of values of the various parameters. However, parameters of a physical system, such as engine 100, ECM 120, etc., may have variable delays during operation. For example, signals associated with different input parameters may be propagated through the physical system at different speed. Certain signals may be propagated faster than others. With the speed differences, input parameters 302 may be unable to reflect the values of the parameters at approximately the same time.

Figure 4:
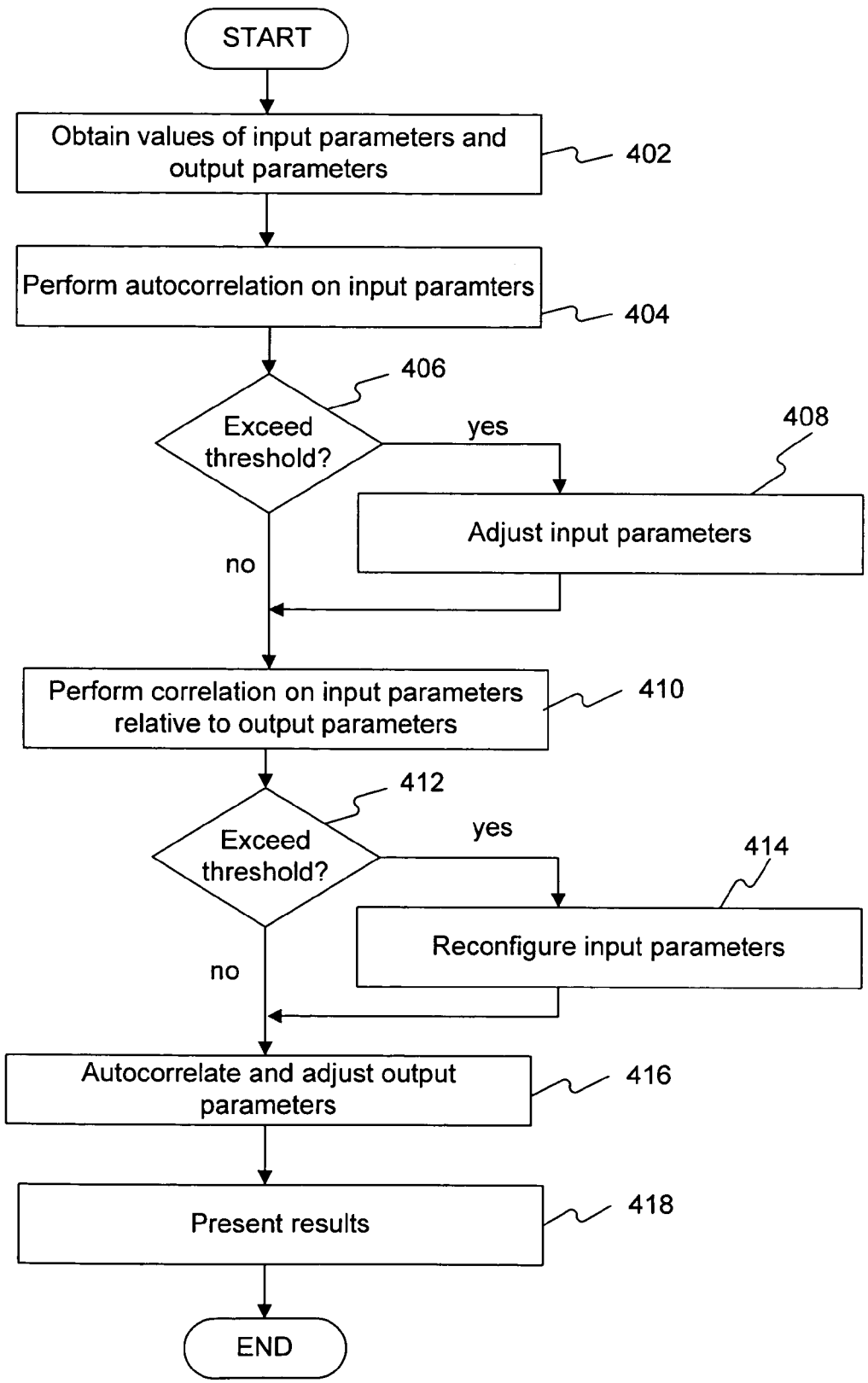
FIG. 4 illustrates an exemplary input parameter configuration process consistent with certain disclosed embodiments.

Further, input parameters 302 may be provided via physical sensors within engine system 100. For example, physical temperature sensors and physical pressure sensors may be used to provide intake manifold temperature and intake manifold pressure, respectively. Because response time for physical sensors may be different, the parameters provided by the physical sensors may also have a time difference. Processor 202 may perform a parameter configuration process to adjust input parameters 302 and/or input parameter configurations of virtual sensor 300 to remove or reduce the effect of the time difference. FIG. 4 shows an exemplary input parameter configuration process performed by processor 202.

As shown in FIG. 4, processor 202 may obtain values of input parameters and output parameters (step 402). Processor 202 may obtain the values from any appropriate data source, such as a data file, stored data, physical sensor measured data, or automatically generated data. The values may represent individual continuous (analog) or discrete (digital) input parameters 302 or corresponding input signals.

After obtaining the values (step 402), processor 202 may perform an autocorrelation on input parameters 302 (step 404). Autocorrelation, as used herein, may refer to a mathematical tool used to analyze functions or series of values, such as time domain signals. Autocorrelation is a cross-correlation of a signal (e.g., a function in time domain or series of values of an input parameter) with itself. And the cross-correlation (may also refer to cross-covariance) may refer to a measure of similarity of two signals. The autocorrelation may be a function of relative time between values of the same signal or parameter and may also be called the sliding dot product. That is, processor 202 may analyze input parameters 302 as to differences of relative time.

Processor 202 may calculate a series of values of an autocorrelation function with an individual input parameter as an input and may compare the series of values with a predetermined correlation threshold. Processor 202 may determine the predetermined correlation threshold based on the type of applications using virtual sensor 300. For example, in a $NO_x$ virtual sensor application, the correlation threshold may be chosen to have a value of approximately 0.8. Other values, however, may also be used.

Further, processor 202 may determine whether any autocorrelation value of an individual input parameter exceeds the correlation threshold (step 406). If processor 202 determines that an autocorrelation value exceeds the threshold (step 406; yes), processor 202 may adjust the values of the corresponding input parameter such that the autocorrelation value is reduced below the threshold (step 408). For example, processor 202 may calculate an average value of the individual input parameter for a time period based on the autocorrelation value and to replace the value of the individual input parameter associated the time period with the calculated average value.

Such averaging operation may have a smoothing effect to reduce the autocorrelation value of the individual input parameter for the time period. If more than one autocorrelation value exceeds the threshold, more than one averaging operation may be performed. Further, although auto-correlation is used for illustrative purposes, other methods, such as autoregression, kalman filtering, and other active or passive filtering mechanisms, etc., may also be used. That is, the averaging operation or adjustment may be performed by processor 202 based on any appropriate result from analyzing input parameters 302 with respect to differences of relative time and the analyzing mechanism may include autocorrelation, or autoregression, etc.

After adjusting input parameters 302, or if processor 202 determines that no correlation value exceeds the threshold (step 406; no), processor 202 may perform a correlation on input parameters relative to output parameters 306 (step 410). That is, processor 202 may calculate a series of values of a cross-correlation between individual input parameters and individual output parameters. In certain embodiments, the value of the cross-correlation may represent a time delay between input parameters 302 and output parameters 306.

Processor 202 may calculate a series of values of a cross-correlation function with an individual input parameter and an individual output parameter as inputs. For example, processor 202 may calculate the values of a cross-correlation function between an injection timing input parameter and a $NO_x$ emission level output parameter. Further, processor 202 may determine whether any cross-correlation value exceeds a predetermined threshold (step 412).

Figure 5:
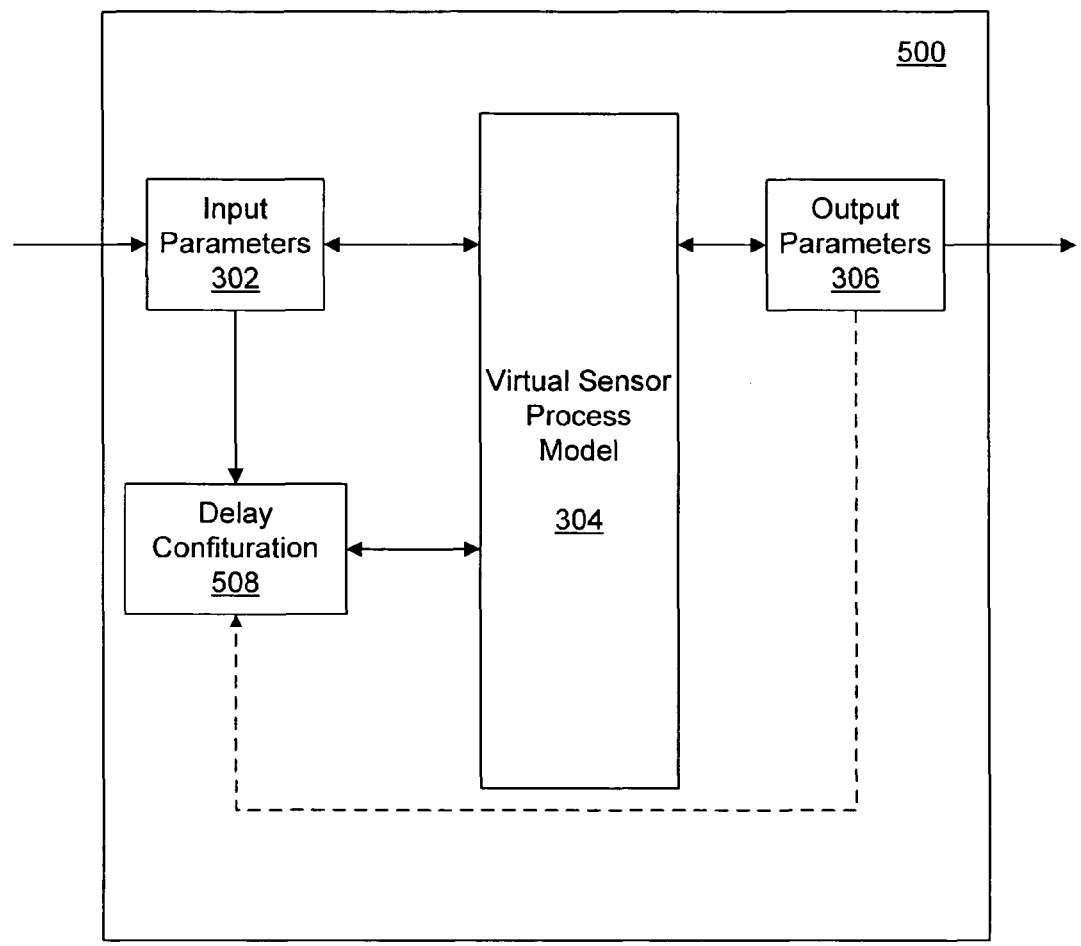
FIG. 5 illustrates another block diagram of an exemplary virtual sensor system consistent with certain disclosed embodiments.

If processor 202 determines that a cross-correlation value exceeds the threshold (step 412; yes), processor 202 may reconfigure the corresponding individual input parameter (step 414). Processor 202 may introduce an additional input parameter that is the individual parameter with a delay equivalent to the time delay corresponding to the cross-correlation value. Further, if more than one cross-correlation value exceeds the threshold, processor 202 may introduce an additional input parameter with a delay equivalent to a delay producing the largest cross-correlation value among the more than one exceeding cross-correlation threshold values. In certain embodiments, processor 202 may also create more than one additional input parameters each with a different delay corresponding to a different exceeding cross-correlation value. FIG. 5 shows an exemplary virtual sensor 500 with reconfigured input parameters.

Figure 6:
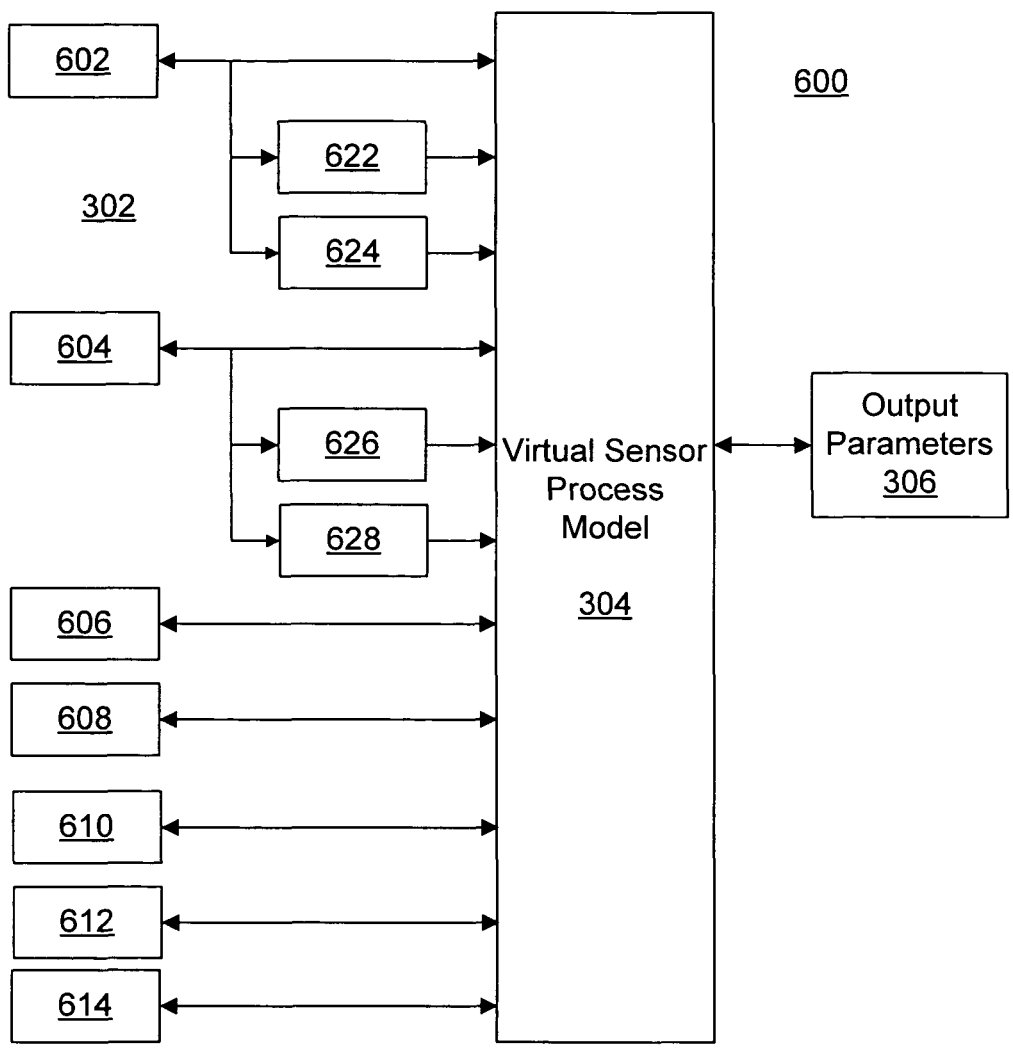
FIG. 6 illustrates another block diagram of an exemplary virtual sensor system consistent with certain disclosed embodiments.

As shown in FIG. 5, virtual sensor 500 may include input parameters 302, virtual sensor process model 304, output parameters 306, and a delay configuration 508. As explained above, delay configuration 508 may include any appropriate logic to add additional input parameters that are delayed input parameters 302. Further, optionally, in certain embodiments, output parameters 306 may be included in input parameters 302 as a feedback to improve performance of virtual sensor 500. Delay configuration 508 may also provide fed back output parameters 306 to virtual sensor process model 304, with or without a predetermined delay. Further, delay configuration 508 may determine delayed input parameters 302 individually with respect to a specific input parameter. FIG. 6 shows an virtual sensor 600 with an exemplary delay configuration.

As shown in FIG. 6, virtual sensor process model 304 may be provided with input parameters 302 including a fuel rate 602, an injection timing 604, an intake manifold pressure 606, an intake manifold temperature 608, an IVA end of current 610, an injection pressure 612, and an engine speed 614. Other input parameters, however, may also be provided.

Further, input parameters 302 may also include a first fuel rate delay 622, a second fuel rate delay 624, a first injection timing delay 626, and a second injection timing delay 628. Although only fuel rate delays and injection timing delays are illustrated, delays of other input parameters may also be used.

Processor 202 may determine the values of first fuel rate delay 622, second fuel rate delay 624, first injection timing delay 626, and second injection timing delay 628, etc., based on the corresponding cross-correlation values between fuel rate 602 and output parameters 306 (e.g., $NO_x$ emission level, soot emission level, or HC emission level, etc.) and cross-correlation values between injection timing delay 626 and output parameters 306 (e.g., $NO_x$ emission level, soot emission level, or HC emission level, etc.). For example, processor 202 may designate a value of approximately 0.3 seconds as first fuel rate delay 622; a value of approximately 0.9 seconds as second fuel rate delay 624, a value of approximately 0.9 seconds as first injection timing delay 626; and a value of approximately 1.5 seconds as second injection timing delay 628. Other values, however, may also be used.

Returning to FIG. 4, after reconfiguring input parameters 302 (step 414), or if processor 202 determines that no cross-correlation value exceeds the predetermined threshold (step 412; no), processor 202 may optionally auto-correlate and adjust output parameters (step 416). For example, processor 202 may perform autocorrelation on output parameters 306 and may calculate a series of values of an autocorrelation function with an individual output parameter as an input. Further, processor 202 may compare the values with a predetermined correlation threshold and, if any auto-correlation value exceeds the threshold, may perform averaging operations on the individual output parameter with exceeding autocorrelation values for the time period.

Further, processor 202 may present results of the parameter configuration process (step 418). Processor 202 may present the results to users of ECM 120 or to other control systems (not shown) in vehicle 100. Further, processor 202 may also store the results in a data file or in storage 212 such that the stored data may be used in a later time.

Figure 7:
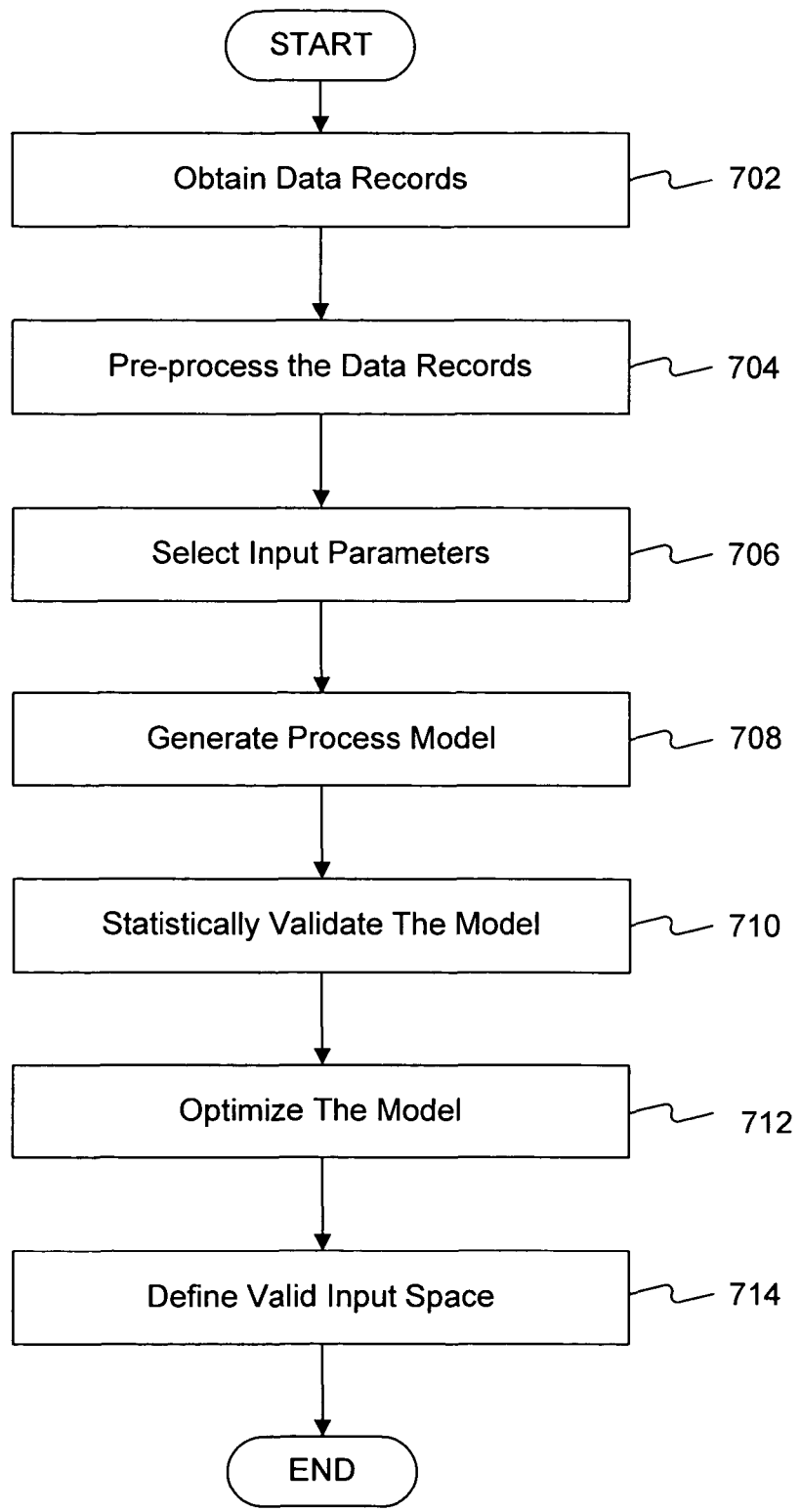
FIG. 7 illustrates a flowchart diagram of an exemplary virtual sensor model generation and optimization process consistent with certain disclosed embodiments.

As explained above, processor 202 or a separate computer system (not shown) may carry out the establishment and operations of virtual sensor process model 304. In certain embodiments, processor 202 may perform a virtual sensor process model generation and optimization process to generate and optimize virtual sensor process model 304. FIG. 7 shows an exemplary model generation and optimization process performed by processor 202.

As shown in FIG. 7, at the beginning of the model generation and optimization process, processor 202 may obtain data records associated with input parameters 302 and output parameters 306 (step 702). The data records may include information characterizing engine operations and emission levels including $NO_x$ emission levels, soot emission levels, and/or HC emission levels. Physical sensors (not shown) may be provided to generate data records on output parameters 306 (e.g., sensing parameters such as $NO_x$ emission levels, soot emission levels, and/or HC emission levels).

ECM 120 or processor 202 may also provide data records on input parameters 302 (e.g., measured parameters, such as fuel rate, injection timing, intake manifold pressure, intake manifold temperature, IVA end of current, injection pressure, engine speed, and certain delayed parameters, etc.). Further, the data records may include both input parameters 302 and output parameters 306 and may be collected based on various engines or based on a single test engine, under various predetermined operational conditions. In certain embodiments, operational conditions such as engine transient operations may also be used to collect data records of input parameters 302 and output parameters 306.

The data records may also be collected from experiments designed for collecting such data. Alternatively, the data records may be generated artificially by other related processes, such as other emission modeling or analysis processes. The data records may also include training data used to build virtual sensor process model 304 and testing data used to validate virtual sensor process model 304. In addition, the data records may also include simulation data used to observe and optimize virtual sensor process model 304.

In certain embodiments, the data records may also include the results presented by processor 202 in the parameter configuration process as described above with respect to FIG. 4. Data records associated with input parameters 302, certain delayed input parameters 302, and output parameters 306 may be included as data records for the purposes of training, simulation, and/or validation of virtual sensor process model 304.

The data records may reflect characteristics of input parameters 302 and output parameters 306, such as statistic distributions, normal ranges, and/or precision tolerances, etc. After obtaining the data records (step 702), processor 202 may pre-process the data records to clean up the data records for obvious errors and to eliminate redundancies (step 704). Processor 202 may remove approximately identical data records and/or remove data records that are out of a reasonable range in order to be meaningful for model generation and optimization. After the data records have been pre-processed, processor 202 may select proper input parameters by analyzing the data records (step 706).

The data records may be associated with many input variables, such as variables corresponding to fuel rate, injection timing, intake manifold pressure, intake manifold temperature, IVA end of current, injection pressure, and engine speed, etc. and other variables that are not corresponding to above listed parameters, such as torque, acceleration, etc. The number of input variables may be greater than the number of a particular set of input parameters 102 used for virtual sensor process model 304. That is, input parameters 102 may be a subset of the input variables, and only selected input variables may be included in input parameters 302. For example, input parameter 302 may include fuel rate, injection timing, intake manifold pressure, intake manifold temperature, IVA end of current, injection pressure, and engine speed, etc., of the input variables.

A large number of input variables may significantly increase computational time during generation and operations of the mathematical models. The number of the input variables may need to be reduced to create mathematical models within practical computational time limits. That is, input parameters 302 may be selected from the input variables such that virtual sensor process model 304 may be operated with a desired speed or efficiency. Additionally, in certain situations, the number of input variables in the data records may exceed the number of the data records and lead to sparse data scenarios. Some of the extra input variables may have to be omitted in certain mathematical models such that practical mathematical models may be created based on reduced variable number.

Processor 202 may select input parameters 302 from the input variables according to predetermined criteria. For example, processor 202 may choose input parameters 302 by experimentation and/or expert opinions. Alternatively, in certain embodiments, processor 202 may select input parameters based on a mahalanobis distance between a normal data set and an abnormal data set of the data records. The normal data set and abnormal data set may be defined by processor 202 using any appropriate method. For example, the normal data set may include characteristic data associated with input parameters 302 that produce desired values of output parameters 306. On the other hand, the abnormal data set may include any characteristic data that may be out of tolerance or may need to be avoided. The normal data set and abnormal data set may be predefined by processor 202.

Mahalanobis distance may refer to a mathematical representation that may be used to measure data profiles based on correlations between parameters in a data set. Mahalanobis distance differs from Euclidean distance in that mahalanobis distance takes into account the correlations of the data set. Mahalanobis distance of a data set X (e.g., a multivariate vector) may be represented as $$MD_i = (X_i - \mu_x)\Sigma^{-1}(X_i - \mu_x)' \quad (1)$$

where $\mu_x$ is the mean of X and $\Sigma^{-1}$ is an inverse variance-covariance matrix of X. $MD_i$ weights the distance of a data point $X_i$ from its mean $\mu_x$ such that observations that are on the same multivariate normal density contour will have the same distance. Such observations may be used to identify and select correlated parameters from separate data groups having different variances.

Processor 202 may select input parameter 302 as a desired subset of input variables such that the mahalanobis distance between the normal data set and the abnormal data set is maximized or optimized. A genetic algorithm may be used by processor 202 to search input variables for the desired subset with the purpose of maximizing the mahalanobis distance. Processor 202 may select a candidate subset of the input variables based on a predetermined criteria and calculate a mahalanobis distance $MD_{normal}$ of the normal data set and a mahalanobis distance $MD_{abnormal}$ of the abnormal data set. Processor 202 may also calculate the mahalanobis distance between the normal data set and the abnormal data (i.e., the deviation of the mahalanobis distance $MD_x = MD_{normal} - MD_{abnormal}$). Other types of deviations, however, may also be used.

Processor 202 may select the candidate subset of input variables if the genetic algorithm converges (i.e., the genetic algorithm finds the maximized or optimized mahalanobis distance between the normal data set and the abnormal data set corresponding to the candidate subset). If the genetic algorithm does not converge, a different candidate subset of input variables may be created for further searching. This searching process may continue until the genetic algorithm converges and a desired subset of input variables (e.g., input parameters 302) is selected.

Optionally, mahalanobis distance may also be used to reduce the number of data records by choosing a part of data records that achieve a desired mahalanobis distance, as explained above.

After selecting input parameters 302 (e.g., fuel rate, injection timing, intake manifold pressure, intake manifold temperature, IVA end of current, injection pressure, and engine speed, etc.), processor 202 may generate virtual sensor process model 304 to build interrelationships between input parameters 302 and output parameters 306 (step 708). In certain embodiments, virtual sensor process model 304 may correspond to a computational model, such as, for example, a computational model built on any appropriate type of neural network.

The type of neural network computational model that may be used may include any appropriate type of neural network model. For example, a feed forward neural network model may be included to establish virtual sensor process model 304. Other types of neural network models, such as back propagation, cascaded neural networks, and/or hybrid neural networks, etc., may also be used. Particular type or structures of the neural network used may depend on particular applications. Although neural network models are illustrated, other types of computational models, such as linear system or non-linear system models, etc., may also be used.

The neural network computational model (i.e., virtual sensor process model 304) may be trained by using selected data records. For example, the neural network computational model may include a relationship between output parameters 306 (e.g., $NO_x$ emission level, soot emission level, and/or HC emission level, etc.) and input parameters 302 (e.g., fuel rate, injection timing, intake manifold pressure, intake manifold temperature, IVA end of current, injection pressure, and engine speed, etc.). The neural network computational model may be evaluated by predetermined criteria to determine whether the training is completed. The criteria may include desired ranges of accuracy, time, and/or number of training iterations, etc.

After the neural network has been trained (i.e., the computational model has initially been established based on the predetermined criteria), processor 202 may statistically validate the computational model (step 710). Statistical validation may refer to an analyzing process to compare outputs of the neural network computational model with actual or expected outputs to determine the accuracy of the computational model. Part of the data records may be reserved for use in the validation process.

Alternatively, processor 202 may also generate simulation or validation data for use in the validation process. This may be performed either independently of a validation sample or in conjunction with the sample. Statistical distributions of inputs may be determined from the data records used for modeling. A statistical simulation, such as Latin Hypercube simulation, may be used to generate hypothetical input data records. These input data records are processed by the computational model, resulting in one or more distributions of output characteristics. The distributions of the output characteristics from the computational model may be compared to distributions of output characteristics observed in a population. Statistical quality tests may be performed on the output distributions of the computational model and the observed output distributions to ensure model integrity.

Once trained and validated, virtual sensor process model 304 may be used to predict values of output parameters 306 when provided with values of input parameters 302. Further, processor 202 may optimize virtual sensor process model 304 by determining desired distributions of input parameters 302 based on relationships between input parameters 302 and desired distributions of output parameters 306 (step 712).

Processor 202 may analyze the relationships between desired distributions of input parameters 302 and desired distributions of output parameters 306 based on particular applications. For example, processor 202 may select desired ranges for output parameters 306 (e.g., $NO_x$ emission level, soot emission level, or HC emission level that is desired or within certain predetermined range). Processor 202 may then run a simulation of the computational model to find a desired statistic distribution for an individual input parameter (e.g., one of fuel rate, injection timing, intake manifold pressure, intake manifold temperature, IVA end of current, injection pressure, engine speed, and certain delayed parameters, etc.). That is, processor 202 may separately determine a distribution (e.g., mean, standard variation, etc.) of the individual input parameter corresponding to the normal ranges of output parameters 306. After determining respective distributions for all individual input parameters, processor 202 may combine the desired distributions for all the individual input parameters to determine desired distributions and characteristics for overall input parameters 302.

Alternatively, processor 202 may identify desired distributions of input parameters 302 simultaneously to maximize the possibility of obtaining desired outcomes. In certain embodiments, processor 202 may simultaneously determine desired distributions of input parameters 302 based on zeta statistic. Zeta statistic may indicate a relationship between input parameters, their value ranges, and desired outcomes. Zeta statistic may be represented as $$\zeta = \sum_{1}^{j} \sum_{1}^{i} |S_{ij}| \left(\frac{\sigma_i}{\bar{x}_i}\right)\left(\frac{\bar{x}_j}{\sigma_j}\right),$$

where $\bar{x}_i$ represents the mean or expected value of an ith input; $\bar{x}_j$ represents the mean or expected value of a jth outcome; $\sigma_i$ represents the standard deviation of the ith input; $\sigma_j$ represents the standard deviation of the jth outcome; and $|S_{ij}|$ represents the partial derivative or sensitivity of the jth outcome to the ith input.

Under certain circumstances, $\bar{x}_i$ may be less than or equal to zero. A value of $3\sigma_i$ may be added to $\bar{x}_i$ to correct such problematic condition. If, however, $\bar{x}_i$ is still equal zero even after adding the value of $3\sigma_i$, processor 202 may determine that $\sigma_i$ may be also zero and that the process model under optimization may be undesired. In certain embodiments, processor 202 may set a minimum threshold for $\sigma_i$ to ensure reliability of process models. Under certain other circumstances, $\sigma_i$ may be equal to zero. Processor 202 may then determine that the model under optimization may be insufficient to reflect output parameters within a certain range of uncertainty. Processor 202 may assign an indefinite large number to $\zeta$.

Processor 202 may identify a desired distribution of input parameters 302 such that the zeta statistic of the neural network computational model (i.e., virtual sensor process model 304) is maximized or optimized. An appropriate type of genetic algorithm may be used by processor 202 to search the desired distribution of input parameters 302 with the purpose of maximizing the zeta statistic. Processor 202 may select a candidate set of values of input parameters 302 with predetermined search ranges and run a simulation of virtual sensor process model 304 to calculate the zeta statistic parameters based on input parameters 302, output parameters 306, and the neural network computational model (e.g., virtual sensor process model 304). Processor 202 may obtain $\bar{x}_i$ and $\sigma_i$ by analyzing the candidate set of values of input parameters 302, and obtain $\bar{x}_j$ and $\sigma_j$ by analyzing the outcomes of the simulation. Further, processor 202 may obtain $|S_{ij}|$ from the trained neural network as an indication of the impact of the ith input on the jth outcome.

Processor 202 may select the candidate set of values of input parameters 302 if the genetic algorithm converges (i.e., the genetic algorithm finds the maximized or optimized zeta statistic of virtual sensor process model 304 corresponding to the candidate set values of input parameters 302). If the genetic algorithm does not converge, a different candidate set of values of input parameters 302 may be created by the genetic algorithm for further searching. This searching process may continue until the genetic algorithm converges and a desired set of values of input parameters 302 is identified. Processor 202 may further determine desired distributions (e.g., mean and standard deviations) of input parameters 302 based on the desired set of values of input parameters 302. Once the desired distributions are determined, processor 202 may define a valid input space that may include any input parameter within the desired distributions (step 714).

In one embodiment, statistical distributions of certain input parameters may be impossible or impractical to control. For example, an input parameter may be associated with a physical attribute of a device, such as a dimensional attribute of an engine part, or the input parameter may be associated with a constant variable within virtual sensor process model 304 itself. These input parameters may be used in the zeta statistic calculations to search or identify desired distributions for other input parameters corresponding to constant values and/or statistical distributions of these input parameters.

Further, optionally, more than one virtual sensor process model may be established. Multiple established virtual sensor process models may be simulated by using any appropriate type of simulation method, such as statistical simulation. For example, around 150 models may be simulated. Output parameters 306 based on simulation of these multiple virtual sensor process models may be compared to select a most-fit virtual sensor process model or several most-fit virtual sensor process models based on predetermined criteria, such as smallest variance with outputs from corresponding physical sensors, etc. The selected most-fit virtual sensor process model 304 may be deployed in virtual sensor applications and engine control applications.

After virtual sensor process model 304 is trained, validated, optimized, and/or selected, ECM 120 and virtual sensor 300 may provide control functions to relevant components of vehicle 100. For example, virtual sensor process model 304 may calculate or predict $NO_x$ emission level, soot emission level, and/or HC emission level and ECM 120 may control engine 110 according to the regulated emission levels provided by virtual sensor 300, and, in particular, by virtual sensor process model 304. In certain embodiments, a separate virtual sensor process model 304 may be used to predict a single regulated emission level, such as $NO_x$ emission level, soot emission level, or HC emission level, etc. The separate virtual sensor process models may be used concurrently by ECM 120 to provide the control functions. That is, the virtual sensor process models may be connected in parallel to provide regulated emission levels.

Figure 8:
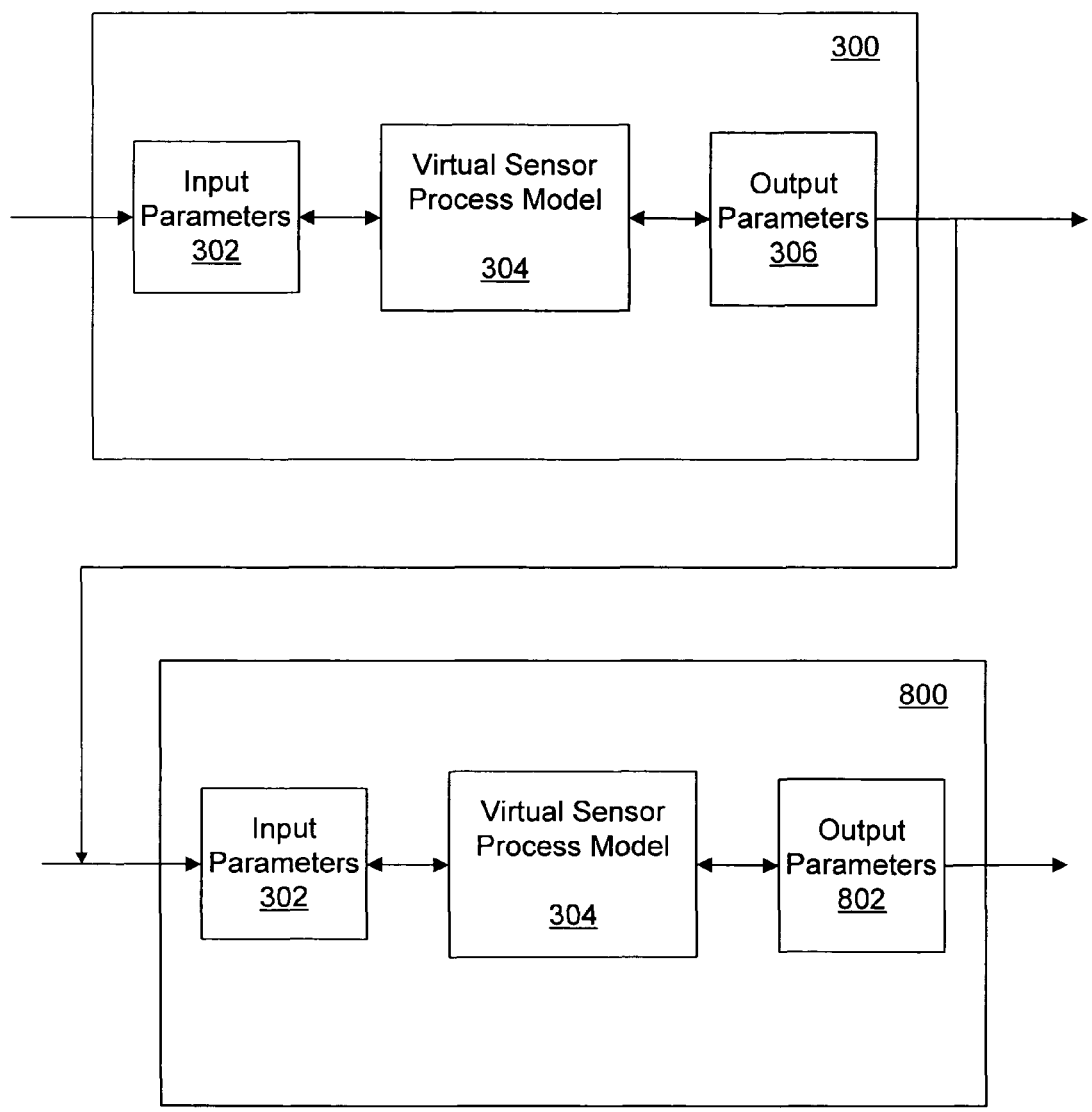
FIG. 8 illustrates another block diagram of an exemplary virtual sensor system consistent with certain disclosed embodiments.

On the other hand, a virtual sensor process model 304 may also predict more than one regulated emission level or all regulated emission levels. Further, ECM 120, or processor 202, may also use virtual sensor process model 304 to provide other emission control parameters or engine parameters. FIG. 8 shows an exemplary configuration of virtual sensor process models provided by ECM 120, or processor 202.

Processor 202 may provide, as shown in FIG. 8, a virtual sensor 800 in addition to virtual sensor 300. Virtual sensor 800 may include input parameters 302, virtual sensor process model 304, and output parameters 802. Although not shown in FIG. 8, virtual sensor 300 and virtual sensor 800 may also include an input parameter delay configuration to introduce various delays as shown in FIG. 5.

Output parameters 802 may include various emission control parameters or engine parameters, such as soot oxidation rate, soot passive regeneration rate, exhaust manifold temperature, air system pressure and temperature estimations, gas-to-brick temperature offset estimation, auxiliary regeneration flame detection temperature, etc. The soot passive regeneration rate may be used to predict $NO_x$-based regeneration of diesel particle filters (DPF) used in engine 110; the gas-to-brick temperature offset may be used to predict a difference between DPF inlet temperature reading and related ceramic substrate temperature; and the auxiliary regeneration flame detection temperature may be used to predict flame temperature of a combustor in an auxiliary regeneration device that provides energy or fuel to DPFs. Input parameters 302 corresponding to output parameters 802 may also include additional parameters, such as total exhaust mass flow, DPF inlet temperature, DPF outlet temperature, exhaust oxygen fraction, turbo out temperature, engine coolant temperature, ambient air temperature, etc.

Further, processor 202 may use virtual sensor process model 304 to generate output parameters 802 based on both output parameters 306 (e.g., $NO_x$ emission level, soot emission level, or HC emission level, etc.) from virtual sensor 300 and input parameters 302 (e.g., fuel rate, injection timing, intake manifold pressure, intake manifold temperature, IVA end of current, injection pressure, engine speed, and certain delayed parameters, etc.). In certain embodiments, a separate virtual sensor process model 304 may be used to predict a single parameter, such as soot oxidation rate, soot passive regeneration rate, exhaust manifold temperature, air system pressure and temperature estimations, gas-to-brick temperature offset estimation, or auxiliary regeneration flame detection temperature, etc. The separate virtual sensor process models may be used in parallel or in series by ECM 120 to provide the control functions. On the other hand, a virtual sensor process model 304 may also predict more than one of these parameters or all of these parameters.

Figure 9:
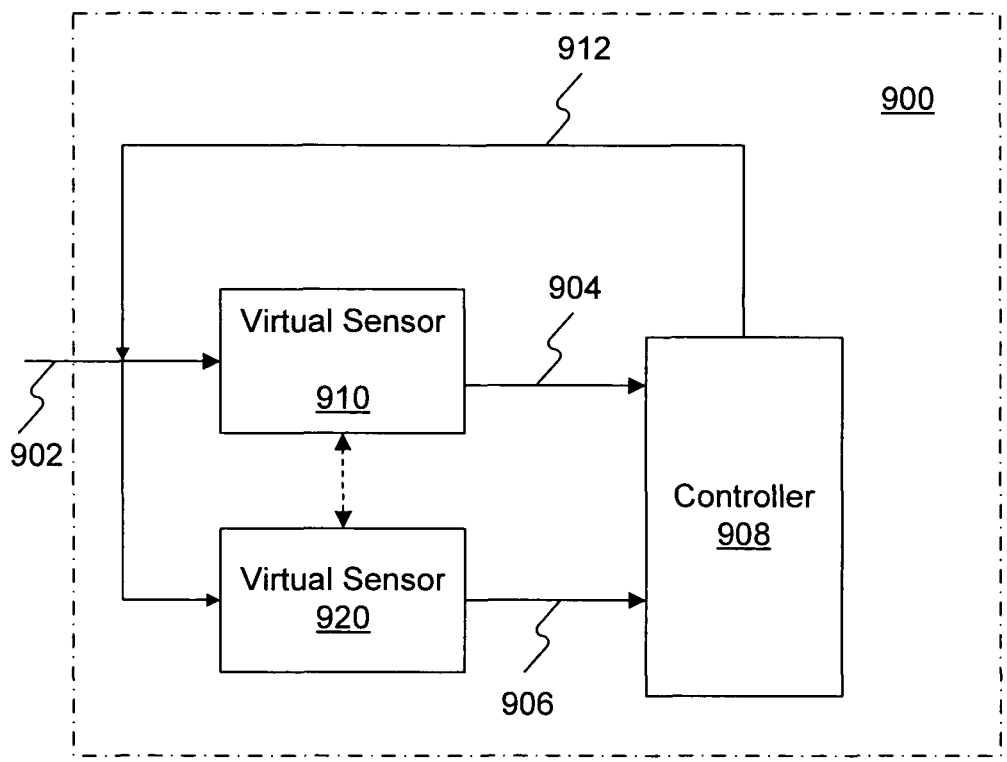
FIG. 9 illustrates another block diagram of an exemplary control system consistent with certain disclosed embodiments.

After obtaining the regulated emission levels and the various emission control parameters and engine parameters, ECM 120 may control engine 110 accordingly. In certain embodiments, ECM 120 may control engine 110 by providing or changing values of various engine parameters, such as fuel rate, injection timing, intake manifold pressure, intake manifold temperature, IVA end of current, injection pressure, and engine speed, etc. That is, ECM 120 may generate desired values of input parameters 302 based on output parameters 306; and may also derive the values of output parameters 306 based on the values of input parameters 302. Therefore, ECM 120 may include a closed loop virtual sensor control system for providing such control functions. FIG. 9 shows an exemplary closed loop virtual sensor control system 900 implemented by ECM 120.

As shown in FIG. 9, ECM 120 (not shown) may implement virtual sensor control system 900 as to include an input 902, a virtual sensor 910, a virtual sensor 920, an output 904, an output 906, a controller 908, and an output 912. Although two virtual sensors are included for the purpose of illustration, any appropriate number of virtual sensors may be included.

Input 902 may include any appropriate initial input parameters, such as input parameters 302 (e.g., fuel rate, injection timing, intake manifold pressure, intake manifold temperature, IVA end of current, injection pressure, engine speed, and/or certain delayed parameters, etc.). Input 902 may be obtained from physical sensors, from stored data records, or from other control systems within engine system 102.

Virtual sensor 910 and virtual sensor 920 may include any appropriate established virtual sensor, such as virtual sensor 300, virtual sensor 500, virtual sensor 600, and/or virtual sensor 800. Virtual sensors 910 and 920 may generate outputs 904 and 906, respectively, based on virtual sensor process model 304 (as described with respect to FIG. 3) and input 902. For example, output 904 may include one or more regulated emission levels, such as $NO_x$ emission level, soot emission level, or HC emission level, etc., and output 906 may include one or more emission control parameters and engine parameters, such as soot oxidation rate, soot passive regeneration rate, exhaust manifold temperature, air system pressure and temperature estimations, gas-to-brick temperature offset estimation, auxiliary regeneration flame detection temperature, etc.

Further, controller 908 may determine output 912 based on output 904 and output 906. Output 912 may include any appropriate engine parameters, such as fuel rate, injection timing, intake manifold pressure, intake manifold temperature, IVA end of current, injection pressure, and/or engine speed, etc. Other parameters, however, may also be included. Controller 908 may include any appropriate hardware and/or software logic provided to determine output 912 based on outputs 904 and 906. As a closed-loop system, ECM 120 may also provide output 912 as an input to virtual sensors 910 and 920 for continuous operation.

In certain embodiments, virtual sensors 910 and 920 may directly generate values of engine control parameters without generating respective regulated emission levels or emission control parameters and engine parameters. For example, output 904 may include engine parameters, such as fuel rate, injection timing, intake manifold pressure, intake manifold temperature, IVA end of current, injection pressure, and/or engine speed, etc., but may not include the regulated emission levels, such as $NO_x$ emission level, soot emission level, or HC emission level, etc., even though the engine parameters may be generated based on virtual process model or models based on the regulated emission levels. Output 906 may also include engine control parameters, such as fuel rate, injection timing, intake manifold pressure, intake manifold temperature, IVA end of current, injection pressure, and/or engine speed, etc., but may not include emission control parameters and engine parameters, such as fuel rate, injection timing, intake manifold pressure, intake manifold temperature, IVA end of current, injection pressure, and/or engine speed, etc., even though the engine control parameters may be generated based on virtual process model or models based on the emission control parameters and engine parameters.

Further, controller 908 may combine the separate sets of values of engine operation characteristic parameters (e.g., outputs 904 and 906) based on certain predetermined criteria, such as any appropriate average or mean based algorithm or priority based algorithm, etc., and may determine output 912 based on the separate sets of engine control parameters without explicit values of regulated emission levels and/or emission control parameters and engine parameters. The combined or determined output 912 may be provided as input to virtual sensors 910 and 920 for continuous operations.

INDUSTRIAL APPLICABILITY

The disclosed systems and methods may provide efficient and accurate virtual sensor process models in substantially less time than other virtual sensing techniques. Such technology may be used in a wide range of virtual sensors, such as sensors for engines, structures, environments, and materials, etc. In particular, the disclosed systems and methods provide practical solutions when process models are difficult to build using other techniques due to computational complexities and limitations. When input parameters are optimized simultaneously to derive output parameters, computation may be minimized. The disclosed systems and methods may be used in combination with other process modeling techniques to significantly increase speed, practicality, and/or flexibility.

The disclosed systems and methods may provide flexible solutions as well. The disclosed virtual sensor system may be used interchangeably with a corresponding physical sensor and may be used to replace the physical sensor and may operate separately and independently of the physical sensor. The disclosed virtual sensor system may also be used to back up the physical sensor. Moreover, the virtual sensor system may provide parameters that are unavailable from a single physical sensor, such as data from outside the sensing environment. The disclosed systems and methods may also be used by vehicle manufacturers to reduce cost and increase reliability by replacing costly or failure-prone physical sensors. Reliability and flexibility may also be improved by adding backup sensing resources via the disclosed virtual sensor system. The disclosed virtual sensor techniques may be used to provide a wide range of parameters in components such as emission, engine, transmission, navigation, and/or control, etc. Further, parts of the disclosed system or steps of the disclosed method may also be used by computer system providers to facilitate or integrate other process models.

Other embodiments, features, aspects, and principles of the disclosed exemplary systems will be apparent to those skilled in the art and may be implemented in various environments and systems.

What is claimed is:

1. A computer-implemented method for a virtual sensor system, comprising:
    obtaining data records associated with a plurality of input parameters and at least one output parameter;
    adjusting, by at least one computer processor, values of the input parameters based on results from analyzing respective input parameters, the adjusting including autocorrelating the respective input parameters;
    reconfiguring, by the at least one computer processor, the input parameters, including cross-correlating respective autocorrelated input parameters with the output parameter; and establishing a first virtual sensor process model indicative of interrelationships between the correlated and cross-correlated input parameters and the output parameter.

2. The method according to claim 1, wherein the autocorrelating includes:
inputting values of an individual input parameter to an autocorrelation function;
calculating a series of values of the autocorrelation function based on the values of the individual input parameter;
determining whether a calculated autocorrelation value exceeds a predetermined autocorrelation threshold; and
if the calculated autocorrelation value exceeds the threshold, performing an averaging operation on the values of the individual input parameter such that the calculated autocorrelation value is reduced below the threshold.

3. The method according to claim 1, wherein the cross-correlating includes:
inputting values of an individual input parameter and values of the output parameter to a cross-correlation function;
calculating a series of values of the cross-correlation function based on the values of the individual input parameter and the values of the output parameter;
determining whether a calculated cross-correlation value exceeds a predetermined cross-correlation threshold; and
if the calculated cross-correlation value exceeds the threshold, adding an additional input parameter that is the individual input parameter with a delay corresponding to the calculated cross-correlation value.

4. The method according to claim 3, further including:
determining whether a plurality of calculated cross-correlation values exceeds the predetermined cross-correlation threshold; and
if the plurality of calculated cross-correlation values exceed the threshold, adding a plurality of additional input parameters each representing the individual input parameter with a separate delay corresponding to a calculated cross-correlation value.

5. The method according to claim 3, further including:
determining whether a plurality of calculated cross-correlation values exceeds the predetermined cross-correlation threshold;
if the plurality of calculated cross-correlation values exceed the threshold, determining a largest calculated cross-correlation value among the plurality of calculated cross-correlation values; and
adding an additional input parameter that is the individual input parameter with a delay corresponding to the largest calculated cross-correlation value.

6. The method according to claim 1, wherein the at least one output parameter includes at least one regulated emission level of an engine.

7. The method according to claim 6, wherein the at least one output parameter includes one of a $NO_x$ emission level, a soot emission level, and an HC emission level.

8. The method according to claim 1, wherein the plurality input parameters include engine speed, fuel rate, injection timing, intake manifold temperature, intake manifold pressure, inlet valve actuation end of current, and injection pressure.

9. The method according to claim 4, wherein the plurality input parameters include at least one delayed representation of one of the plurality input parameters.

10. The method according to claim 1, wherein the adjusting the values of the input parameters is based on autoregression of the respective input parameters.

11. The method according to claim 1, further including:
providing the output parameter as a feedback to the input parameters for establishing the virtual sensor process model.

12. The method according to claim 11, further including:
establishing a second virtual sensor process model indicative of interrelationships between the correlated and cross-correlated input parameters and another output parameter different from the at least one output parameter; and
coupling the first virtual sensor process model and the second virtual sensor process model simultaneously to provide engine control parameters.

13. The method according to claim 12, wherein the another output parameter includes one of soot oxidation rate, soot passive regeneration rate, exhaust manifold temperature, air system pressure and temperature estimations, gas-to-brick temperature offset estimation, and auxiliary regeneration flame detection temperature.

14. The method according to claim 1, wherein the establishing includes:
creating a neural network computational model indicative of the interrelationships between the input parameters and the output parameter;
training the neural network computational model using the data records;
validating the neural network computation model using the data records;
determining desired statistical distributions of the plurality of input parameters of the computational model; and
recalibrating the plurality of input parameters based on the desired statistical distributions to define a desired input space.

15. The method according to claim 14, wherein determining the desired statistical distributions further includes:
determining a candidate set of the input parameters with a maximum zeta statistic using a genetic algorithm; and
determining the desired distributions of the input parameters based on the candidate set,
wherein the zeta statistic $\zeta$ is represented by:

$$\zeta = \sum_1^j \sum_1^i |S_{ij}|\left(\frac{\sigma_i}{\bar{x}_i}\right)\left(\frac{\bar{x}_j}{\sigma_j}\right),$$

provided that $\bar{x}_i$ represents a mean of an ith input; $\bar{x}_j$ represents a mean of a jth output; $\sigma_i$ represents a standard deviation of the ith input; $\sigma_j$ represents a standard deviation of the jth output; and $|S_{ij}|$ represents sensitivity of the jth output to the ith input of the computational model.

16. A computer system for establishing a virtual sensor system, comprising:
a database configured to store information relevant to the virtual sensor system; and
a processor configured to:
obtain data records associated with a plurality of input parameters and at least one output parameter;
adjust values of the input parameters based on autocorrelation of respective input parameters;
reconfigure the input parameters based on cross-correlation of respective input parameters relative to the output parameter; and establish a virtual sensor process model indicative of interrelationships between the autocorrelated and cross-correlated input parameters and the output parameter.

17. The computer system according to claim 16, wherein, to autocorrelate the values of the input parameters, the processor is further configured to:
    input values of an individual input parameter to an autocorrelation function;
    calculate a series of values of the autocorrelation function based on the values of the individual input parameter;
    determine whether a calculated autocorrelation value exceeds a predetermined autocorrelation threshold; and
    if the calculated autocorrelation value exceeds the threshold, perform an averaging operation on the values of the individual input parameter such that the calculated autocorrelation value is reduced below the threshold.

18. The computer system according to claim 16, wherein, to cross-correlate the input parameters, the processor is further configured to:
    input values of an individual input parameter and values of the output parameter to a cross-correlation function;
    calculate a series of values of the cross-correlation function based on the values of the individual input parameter and the values of the output parameter;
    determine whether a calculated cross-correlation value exceeds a predetermined cross-correlation threshold; and
    if the calculated cross-correlation value exceeds the threshold, add an additional input parameter that is the individual input parameter with a delay corresponding to the calculated cross-correlation value.

19. The computer system according to claim 16, wherein the processor is further configured to:
    determine whether a plurality of calculated cross-correlation values exceeds the predetermined cross-correlation threshold; and
    if the plurality of calculated cross-correlation values exceed the threshold, add a plurality of additional input parameters each representing the individual input parameter with a separate delay corresponding to a calculated cross-correlation value.

20. The computer system according to claim 16, wherein the at least one output parameter includes at least one of regulated emission level of a $NO_x$ emission level, a soot emission level, and an HC emission level of an engine.

21. The computer system according to claim 19, wherein the plurality input parameters include fuel rate, fuel rate with a first delay, and fuel rate with a second delay.

22. The computer system according to claim 19, wherein the plurality input parameters include injection timing, injection timing with a first delay, and injection timing with a second delay.

23. The computer system according to claim 16, wherein, to establish the virtual sensor process model, the processor is further configured to:
    create a neural network computational model indicative of the interrelationships between the input parameters and the output parameter;
    train the neural network computational model using the data records;
    validate the neural network computation model using the data records;
    determine desired statistical distributions of the plurality of input parameters of the computational model; and
    recalibrate the plurality of input parameters based on the desired statistical distributions to define a desired input space.

24. The computer system according to claim 23, wherein, to determine the desired statistical distributions, the processor is further configured to:
    determine a candidate set of the input parameters with a maximum zeta statistic using a genetic algorithm; and
    determine the desired distributions of the input parameters based on the candidate set,
    wherein the zeta statistic $\zeta$ is represented by:

$$\zeta = \sum_{1}^{j} \sum_{1}^{i} |S_{ij}| \left(\frac{\sigma_i}{\bar{x}_i}\right)\left(\frac{\bar{x}_j}{\sigma_j}\right),$$

provided that $\bar{x}_i$ represents a mean of an ith input; $\bar{x}_j$ represents a mean of a jth output; $\sigma_i$ represents a standard deviation of the ith input; $\sigma_j$ represents a standard deviation of the jth output; and $|S_{ij}|$ represents sensitivity of the jth output to the ith input of the computational model.

25. The computer system according to claim 16, wherein the processor is implemented using a field programmable gate array (FPGA) device and may be reconfigured to perform the functions of obtaining, adjusting, reconfiguring, and establishing.

* * * * *